United States Patent Office 3,120,551
Patented Feb. 4, 1964

3,120,551
5-(4-BIPHENYLYL)-3-METHYLVALERIC ACID AND FUNCTIONAL DERIVATIVES THEREOF
Eric N. Goldschmidt, Hillside, N.J., assignor to Warner-Lambert Pharmaceutical Company, Morris Plains, N.J., a corporation of Delaware
No Drawing. Filed Mar. 20, 1961, Ser. No. 96,646
5 Claims. (Cl. 260—455)

The present invention relates to new and novel derivatives of 3-methylvaleric acid of the formula:

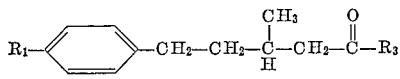

wherein $R_1$ is hydroxy, halo, lower alkoxy,

or

in which $R_2$ is hydrogen, lower alkoxy, hydroxy, nitro or amino, and $R_3$ is hydroxy or a radical of the formula —A—$(CH_2)_n$—$R_4$ wherein A is O, NH or S, $n$ is 2 or 3 and $R_4$ is a di-lower alkylamino, piperidino, pyrrolidino or morpholino group linked to the methylene group through nitrogen. The present invention also relates to a method of preparing these compounds and to the non-toxic pharmaceutically acceptable acid addition salts of those basic compounds where $R_3$ is a radical of the formula —A—$(CH_2)_n$—$R_4$.

The terms "lower alkyl" and "lower alkoxy" as used throughout the specification and in the claims refer to straight and branched chain groups containing 1 to 6 carbon atoms.

The new and novel compounds of this invention have been found to have interesting pharmacological activity in reducing blood cholesterol levels by virtue of their unique property of inhibiting the biosynthesis of cholesterol. Studies of cholesterol biosynthesis have revealed that cholesterol is synthesized within various body tissues, primarily the liver, in a multi-step synthesis initiated by the acetylation of coenzyme A with acetyl fragments present in each tissue. The new and novel compounds of this invention are unusually effective in blocking the conversion of acetyl coenzyme A to cholesterol and its immediate precursors in this biosynthetic route. These compounds are thus valuable agents for use in the control of hypercholesteremia. In use, these compounds may be formulated with conventional pharmaceutical carriers to form dosage unit forms such as tablets, capsules, suppositories, solutions, suspensions and the like.

Exemplary of the new and novel compounds of this invention are 5-(4-biphenylyl)-3-methylvaleric acid,
5-(p-methoxyphenyl)-3-methylvaleric acid,
5-(p-butoxyphenyl)-3-methylvaleric acid,
5-(p-hydroxyphenyl)-3-methylvaleric acid,
5-(p-chlorophenyl)-3-methylvaleric acid,
5-(p-bromophenyl)-3-methylvaleric acid,
5-(p-fluorophenyl)-3-methylvaleric acid,
5-(p-phenoxyphenyl)-3-methylvaleric acid,
5-[4-(p-methoxyphenoxy)phenyl]-3-methylvaleric acid,
5-[4-(p-nitrophenoxy)phenyl]-3-methylvaleric acid,
5-[4-(p-aminophenoxy)phenyl]-3-methylvaleric acid,
5-[4-(p-hydroxyphenoxy)phenyl]-3-methylvaleric acid,
5-(4-biphenylyl)-N-(2-piperidinoethyl)-3-methylvaleramide,
5-(4-biphenylyl)-N-(2-dimethylaminoethyl)-3-methylvaleramide,
5-(4-biphenylyl)-N-(2-piperidinoethyl)-3-methylvaleramide,
2-dimethylaminoethyl 5-(4-biphenylyl)-3-methylvalerate,
2-dimethylaminoethyl 5-(4-biphenylyl)-3-methylthiolvalerate,
2-piperidinoethyl 5-(4-biphenylyl)-3-methylvalerate,
5-[4-(p-methoxyphenyl)phenyl]-3-methylvaleric acid,
5-[4-(p-nitrophenyl)phenyl]-3-methylvaleric acid,
5-[4-(p-aminophenyl)phenyl]-3-methylvaleric acid,
5-[4-(p-hydroxyphenyl)phenyl]-3-methylvaleric acid
and the like.

Those compounds of this invention having the formula:

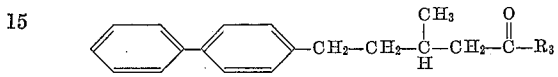

wherein $R_3$ is as described hereinabove are particularly effective inhibitors of the biosynthesis of cholesterol.

Those compounds of this invention of the formula:

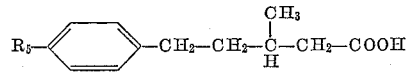

wherein $R_5$ is hydroxy, halo, lower alkoxy,

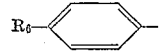

or

in which $R_6$ is hydrogen, lower alkoxy, hydroxy or amino may be prepared by the treatment, under reflux, of a compound of the formula:

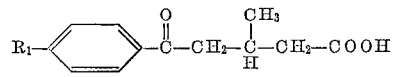

wherein $R_1$ is as described hereinabove, with a reducing medium comprising amalgamated zinc, glacial acetic acid and concentrated hydrochloric acid. The mixture is refluxed for about 15 to 45 minutes, additional concentrated hydrochloric acid is added and refluxing continued for an additional period of time, normally about 30 to about 60 minutes. The mixture is then cooled, decanted from the zinc, concentrated by evaporation and then poured into water. The reaction product is recovered and purified by crystallization.

Alternately a reducing medium comprising palladium on charcoal in the presence of perchloric acid and glacial acetic acid may be employed.

In the above described reaction, the starting materials having terminal nitro or amino groups (that is, compounds where $R_2$ is nitro or amino) are reduced to products having terminal amino groups since the reaction medium employed serves also to reduce the aromatic nitro group to an amino group.

The starting materials for the above described reaction are prepared as described in my copending application, entitled "5-Substituted Derivatives of 5-Oxo-3-Methylvaleric Acid and Process Therefor," application Serial No. 96,719, filed March 20, 1961.

The compound 5-[4-(p-nitrophenyl)phenyl]-3-methylvaleric acid may be prepared by the reaction of 5-(p-halophenyl)-3-methylvaleric acid with p-nitrohalobenzene in the presence of copper.

I have also found that 5-[4-(p-nitrophenoxy)phenyl]3-methylvaleric acid is readily prepared by the reaction of the di-potassium salt of 5-(p-hydroxyphenyl)-3-methylvaleric acid with p-nitrofluorobenzene. 5-[4-(p-nitrophenoxy)phenyl]3-methylvaleric acid may itself be converted to 5-[4-(p-aminophenoxy)phenyl]-3-methylvaleric acid by catalytic reduction, for example by reducing in alcohol with hydrogen over a palladium-on-charcoal or Raney nickel catalyst. In addition, 5-[4-p-aminophenoxy)phenyl]-3-methylvaleric acid may be converted to 5-[4-(p-hydroxyphenoxy)phenyl]-3-methylvaleric acid by reaction in aqueous sulfuric acid with sodium nitrite to form a diazonium salt which is then hydrolyzed in boiling water-xylene in the presence of copper sulfate and concentrated sulfuric acid.

The compounds of this invention of the formula:

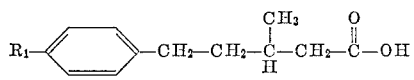

prepared as described above, are readily converted into ester, thiolester or amide derivatives of the formula:

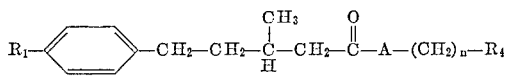

wherein A, $n$ and $R_4$ are as described hereinabove, by reaction of the free acid above with thionyl chloride to form the acid chloride of the formula:

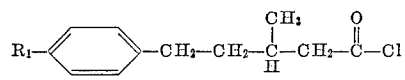

which is, in turn, reacted with an alcohol, thiol or amine of the formula:

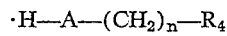

to form the corresponding ester, thiolester or amide derivatives. Alternately, the ester derivatives of the formula:

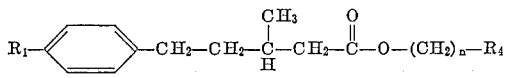

may be prepared by reaction of the free acid with a compound of the formula $Cl—(CH_2)_n—R_4$ in the presence of potassium carbonate.

These ester, thiolester and amide derivatives may be used as the free base, or alternately, in the form of their non-toxic pharmaceutically acceptable acid addition salts, for example, the hydrochloride, sulfate, maleate, benzoate, acetate, tartrate, citrate, nitrate, phosphte and the like salts.

The following examples are included in order further to illustrate the present invention:

Example 1

Into a solution of 25 ml. concentrated HCl in 750 ml. water are added 500 g. zinc (granular, 20 mesh) and 50 g. anhydrous mercuric chloride, and the mixture is stirred for five minutes at room temperature. The supernatant solution is decanted, the zinc patted dry in a paper towel, and immediately added with stirring to a solution of 50 g. 5-(4-biphenylyl)-5-oxo-3-methylvaleric acid in 3000 ml. glacial acetic acid contained in a three-necked flask equipped with equilibrated addition funnel, condenser and stirring motor. During this addition, the heating of the solution is already started, and the addition of the zinc is followed by the rapid addition of 500 ml. concentrated HCl. The solution is now allowed to reach its boiling point as rapidly as possible, and after it has refluxed for about 25 minutes, an additional 500 ml. of concentrated HCl are added as rapidly as possible. On completion of this addition, the mixture is allowed to reflux for an additional 45 minutes, cooled, and decanted from the zinc. It is then concentrated to about half its volume at reduced pressure on a steam bath, allowed to cool down to room temperature, and poured into about 2.5 times its volume of ice-water. After standing for a while, the suspension is vacuum filtered, pressed dry, and then dried in a vacuum oven at about 65° for three hours. It is then crystallized twice from Skellysolve B (hydrocarbon solvent, 75–80% hexane, boiling range 60–90° C.) to give (at 77% yield) 5-(4-biphenylyl)-3-methylvaleric acid, M.P. 92–93° C.

*Analysis.*—Calc.: C, 80.56; H, 7.51. Found: C, 80.21; H, 7.46.

Example 2

A suspension of 6.44 g. (24.4 millimols) 5-(4-biphenylyl)-3-methylvaleric acid prepared as described in Example 1, 3.5 g. (24.4 millimols) 2-(dimethylamino)-ethyl chloride hydrochloride and 5.05 g. (36.6 millimols) potassium carbonate in 140 cc. water-saturated ethyl acetate is allowed to reflux for seven hours, cooled and filtered. The solvent is removed from the filtrate, and the residue distilled. Gaseous hydrogen chloride is bubbled through an ethereal solution of the fraction boiling at 165–175° C./0.15 mm. of mercury. The resulting precipitate is recrystallized from a mixture of 25% ethanol in cyclohexane to give at 55 percent yield the hydrochloride salt of 2-dimethylaminoethyl 5-(4-biphenylyl)-3-methylvalerate, melting point=132.5–133.5° C.

*Analysis.*—Calc.: C, 70.28; H, 8.04; N, 3.76; Cl, 9.43. Found: C, 70.51; H, 8.04; N, 4.06; Cl, 9.43.

Example 3

A suspension of 6 g. (35.4 millimols) 2-(diethylamino) ethanethiol hydrochloride and 5-(4-biphenylyl)-3-methylvaleryl chloride, prepared from 9.5 g. (35.4 millimols) 5-(4-biphenylyl)-3-methylvaleric acid with thionyl chloride is refluxed for four and one-half hours in 200 cc. of an anhydrous mixture of 50:50 benzene-methylene chloride. The resulting solution is cooled to ice bath temperatures and the pH adjusted to 7.5 with ice cold dilute aqueous potassium carbonate. The organic phase is separated, dried and the solvent removed. Gaseous hydrogen chloride is bubbled through an ethereal solution of this residue and the precipitate is recrystallized from a mixture of 25 percent cyclohexane in benzene to yield the hydrochloride salt of 2-diethylaminoethyl 5-(4-biphenylyl) - 3 - methylthiolvalerate, melting point=137–139° C.

*Analysis.*—Calc.: C, 68.62; H, 8.16; N, 3.33; Cl, 8.44. Found: C, 68.04; H, 8.14; N, 3.44; Cl, 8.65.

Example 4

To 160 cc. of an ethereal solution of 11.7 g. (133 millimols) freshly distilled 2-(dimethylamino)ethylamine is added a solution in 160 cc. anhydrous ether of 5-(4-biphenylyl)-3-methylvaleryl chloride prepared from 12.6 g. (45.5 millimols) 5-(4-biphenylyl)-3-methylvaleric acid refluxed in excess thionayl chloride. This suspension is allowed to remain at room temperature for one and one-half days. At the end of this time it is washed with dilute aqueous sodium hydroxide, dried and the solvent removed. The residue is recrystallized from Skellysolve B to give at 50 percent yield 5-(4-biphenylyl)-N-(2-dimethylaminoethyl)-3-methylvaleramide, M.P. 87–88° C. (not reproducible).

*Analysis.*—Calc.: C, 78.06; H, 8.93; N, 8.28. Found: C, 78.07; H, 9.03; N, 8.23.

Example 5

A mixture of 5-(p-methoxyphenyl)-5-oxo-3-methylvaleric acid, glacial acetic acid, concentrated HCl and amalgamated zinc is reacted and the reaction mixture is processed as described in Example 1. Yield: 85 percent of theory of 5-(p-methoxyphenyl)-3-methylvaleric acid, boiling point=147–152° C. at 0.2 mm. of mercury, melting point =42–45° C.

*Analysis.*—Calc.: C, 70.24; H, 8.16. Found: C, 70.26; H, 8.18.

Example 6

A mixture of 5-(p-hydroxyphenyl)-5-oxo-3-methylvaleric acid, glacial acetic acid, concentrated HCl and amalgamated zinc is reacted and the reaction mixture is processed as described in Example 1. Recrystallization of the product from benzene yields 5-(p-hydroxyphenyl)-3-methylvaleric acid, melting point=112–113° C.

*Analysis.*—Calc.: C, 69.20; H, 7.74. Found: C, 69.48; H, 7.84.

Example 7

A suspension of 10.4 g. (50 millimols) 5-(4-hydroxyphenyl)-3-methylvaleric acid as its di-potassium salt, 200 mg. copper powder and 14.1 g. (100 millimols) p-nitrofluorobenzene in 150 cc. diethylene glycol dimethyl ether is allowed to reflux for one hour. The clear yellow solution is poured into 100 ml. 6 N HCl and the precipitate filtered. This solid, when recrystallized from cyclohexane containing 10 percent benzene gives in 70 percent yield 5-[4-(p-nitrophenoxy)phenyl]-3-methylvaleric acid, melting point= 123–124° C.

*Analysis.*—Calc.: C, 65.65; H, 5.82; N, 4.25. Found: C, 65.90; H, 5.95; N, 4.15.

Example 8

A suspension of 10.5 g. (32 millimols) 5-[4-(p-nitrophenoxy)phenyl]-3-methylvaleric acid and 0.5 g. 10 percent palladium-on-carbon in 300 ml. ethanol is reduced under three atmospheres of hydrogen. After the theoretical amount of hydrogen has been taken up, the suspension is heated, filtered and the solvent removed from the filtrate. The residue is recrystallized from 50 percent benzene-cyclohexane to give a 90 percent yield of 5-[4-(p-aminophenoxy)phenyl] - 3 - methylvaleric acid, melting point=140–141° C.

*Analysis.*—Calc.: C, 72.21; H, 7.07; N, 4.68. Found: C, 72.24; H, 6.89; N, 4.88.

Example 9

A mixture of 5-[4-(p-nitrophenoxy)phenyl]-5-oxo-3-methylvaleric acid, glacial acetic acid, concentrated hydrochloric acid and amalgamated zinc is reacted and the reaction mixture is processed as described in Example 1 to yield 5-[4-(p-aminophenoxy)phenyl]-3-methylvaleric acid. A mixed melting point with the product of Example 8 shows no depression.

Example 10

To a cooled fine suspension of 13.5 g. (45 millimols) 5-[4-(p-aminophenoxy)phenyl]-3-methylvaleric acid in 135 ml. 1 N sulfuric acid, an aqueous solution containing 3.32 g. (47.5 millimols) sodium nitrite is added dropwise. The resulting solution is stirred in the cold for an additional one hour. Excess nitrous acid is decomposed by the addition of 4.5 g. urea. The resulting solution of the diazonium salt is added to a boiling solution of 135 g. anhydrous copper sulfate and 6.75 ml. concentrated sulfuric acid in 675 ml. water covered by a layer of 250 ml. xylene at a rate to maintain boiling. The reaction is quenched in an ice bath ten minutes after completion of the addition. The organic phase is separated and the aqueous phase extracted with ether. The combined organic phases are washed with dilute aqueous bicarbonate and with water, and then dried over magnesium sulfate and the solvent removed. The residue is recrystallized from 1:1 benzene-cyclohexane to give at 40 percent yield 5 - [4 - (p - hydroxyphenoxy)phenyl] - 3 - methylvaleric acid, melting point=90–91° C.

*Analysis.*—Calc.: C, 71.98; H, 6.71. Found: C, 72.13; H, 6.95.

Example 11

The catalytic reduction at room temperature and atmospheric pressure over 10 percent palladium-on-charcoal of 5 - [4 - (p - nitrophenoxy)phenyl] - 5 - oxo - 3 - methylvaleric acid in glacial acetic acid containing 4 percent by volume of a 60 percent aqueous solution of perchloric acid gives at 87 percent yield 5-[4-(p-aminophenoxy)phenyl]-3-methylvaleric acid. A mixed melting point with the product of Example 8 shows no depression.

Example 12

A mixture of 5-(p-chlorophenyl)-5-oxo-3-methylvaleric acid, glacial acetic acid, concentrated hydrochloric acid and amalgamated zinc is reacted and the reaction mixture is processed as described in Example 1. The product is distilled and the fraction coming over at 144–147° C. at 0.025 mm. of mercury (78% yield) is recrystallized from n-hexane to yield 5-(p-chlorophenyl)-3-methylvaleric acid, melting point=54–58° C.

*Analysis.*—Calc.: C, 63.57; H, 6.67; Cl, 15.64. Found: C, 63.86; H, 6.46; Cl, 15.47.

Example 13

A mixture of 5-[4-(p-methoxyphenoxy)phenyl]-5-oxo-3-methylvaleric acid, glacial acetic acid, concentrated hydrochloric acid and amalgamated zinc is reacted and the reaction mixture is processed as described in Example 1. Yield: 80 percent of theory of 5-[4-(p-methoxyphenoxy)phenyl]-3-methylvaleric acid, boiling point=195–196° C. at 0.1 mm. of mercury, melting point=73–75° C.

*Analysis.*—Calc.: C, 72.59; H, 7.06. Found: C, 72.65; H, 7.16.

Example 14

A solution of 40 millimols of 5-[4-(p-methoxyphenoxy)phenyl]-3-methylvaleric acid in 80 ml. glacial acetic acid and 80 ml. of 48 percent aqueous hydrobromic acid is refluxed for two hours. The mixture is cooled and poured into 160 ml. water. The solids are recrystallized from carbon tetrachloride to give at 85 percent yield 5 - [4 - (p - hydroxyphenoxy)phenyl] - 3 - methylvaleric acid. A mixed melting point with the product of Example 10 shows no depression.

It is understood that the foregoing detailed description is given merely by way of illustration and that many variations may be made therein without departing from the spirit of my invention.

Having described my invention, what I desire to secure by Letters Patent is:

1. A compound selected from the group consisting of compounds of the formula:

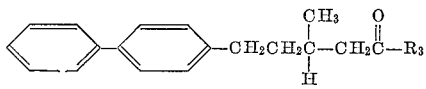

wherein $R_3$ is a member selected from the group consisting of hydroxy and radicals of the formula

wherein A is selected from the group consisting of O, NH and S, and $n$ is 2 to 3, and salts thereof derived from pharmaceutically acceptable acids.

2. 5-(4-biphenylyl)-3-methylvaleric acid.

3. 2-dimethylaminoethyl 5-(4-biphenylyl)3-methylvalerate.

4. 5 - (4 - biphenylyl) - N - (2 - dimethylaminoethyl)-3-methylvaleramide.

5. 2 - dimethylaminoethyl 5 - (4 - biphenyl) - 3 - methylthiolvalerate.

References Cited in the file of this patent

UNITED STATES PATENTS

| | | |
|---|---|---|
| 2,342,142 | Harris et al. | Feb. 22, 1944 |
| 2,458,823 | Avakian et al. | Jan. 11, 1949 |
| 2,460,139 | Marks et al. | Jan. 25, 1949 |
| 2,670,360 | Lott | Feb. 23, 1954 |
| 2,727,040 | Clinton et al. | Dec. 13, 1955 |

OTHER REFERENCES

Lands et al.: J. Pharmacol. Exptl. Therap., 100, 19–26 (1950).

Fieser and Fieser: Organic Chemistry (Boston, 1956), page 544.

Dreiding: Helv. Chim. Acta., 40, 1812–4 (1957).